United States Patent
Mueller et al.

(10) Patent No.: US 11,511,876 B2
(45) Date of Patent: Nov. 29, 2022

(54) VARIABLE POROSITY LOAD-BEARING AND HEAT-DISSIPATING AIRCRAFT STRUCTURES

(71) Applicant: Bell Helicopter Textron Inc., Fort Worth, TX (US)

(72) Inventors: Russell L Mueller, Coppell, TX (US); Tyson Henry, Arlington, TX (US); Colton Gilliland, Northlake, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 77 days.

(21) Appl. No.: 16/208,048

(22) Filed: Dec. 3, 2018

(65) Prior Publication Data

US 2020/0172260 A1 Jun. 4, 2020

(51) Int. Cl.
*B64D 35/00* (2006.01)
*B64C 29/00* (2006.01)
*F16H 57/032* (2012.01)
*F16H 57/04* (2010.01)
*F16H 57/02* (2012.01)
(Continued)

(52) U.S. Cl.
CPC .......... *B64D 35/00* (2013.01); *B64C 29/0033* (2013.01); *F16H 57/032* (2013.01); *F16H 57/0417* (2013.01); *F16H 57/0424* (2013.01); *F16H 57/0479* (2013.01); *B33Y 10/00* (2014.12); *B33Y 80/00* (2014.12); *F16H 2057/02043* (2013.01)

(58) Field of Classification Search
CPC ... B64C 29/0033; B64D 35/00; F16H 57/032; F16H 57/0417; F16H 57/0424; F16H 57/0479; F16H 2057/02043; B33Y 10/00; B33Y 80/00; F28D 1/06; F01D 11/122; F01D 5/288; F01D 5/186; F01D 9/02; F01D 9/041; F01D 25/12; F23R 3/002; F23R 3/007; F28F 13/003; F28F 13/185
USPC ........................................................ 74/606 R
See application file for complete search history.

(56) References Cited

U.S. PATENT DOCUMENTS

| | | | | |
|---|---|---|---|---|
| 4,049,401 | A | * | 9/1977 | Smith .................... B01D 45/14 55/401 |
| 4,755,103 | A | * | 7/1988 | Streifinger .............. F16N 39/06 415/111 |

(Continued)

FOREIGN PATENT DOCUMENTS

| | | | | |
|---|---|---|---|---|
| EP | 3431911 | A1 * | 1/2019 | ............... F28D 7/00 |
| EP | 3718638 | A1 * | 10/2020 | ............... B04B 5/00 |

OTHER PUBLICATIONS

Porous and Cellular Materials for Structural Applications, Editors Schwartz et al., Apr. 13, 1998 (Year: 1998).*

(Continued)

*Primary Examiner* — Vinh Luong
(74) *Attorney, Agent, or Firm* — Pramudji Law Group PLLC; Ari Pramudji

(57) ABSTRACT

Briefly, the disclosure relates to apparatuses and methods to form a gearbox enclosure comprising an external liner, an internal liner, and a variable porosity region disposed between the external liner and the internal liner. The variable porosity region may be configured to accommodate flow of the lubricant, thereby providing a capability to cool, for example, a lubricating fluid at an elevated temperature.

10 Claims, 9 Drawing Sheets

(51) Int. Cl.
    *B33Y 10/00*     (2015.01)
    *B33Y 80/00*     (2015.01)

(56) References Cited

U.S. PATENT DOCUMENTS

| | | | | |
|---|---|---|---|---|
| 6,398,833 | B1* | 6/2002 | Santerre | B01D 45/12 |
| | | | | 55/409 |
| 6,858,056 | B2* | 2/2005 | Kwan | B01D 45/14 |
| | | | | 55/400 |
| 7,017,656 | B2 | 3/2006 | Beddome et al. | |
| 9,453,604 | B1* | 9/2016 | Maloney | B29C 41/02 |
| 10,018,052 | B2 | 7/2018 | Snyder et al. | |
| 2004/0098956 | A1* | 5/2004 | Care | F01M 13/04 |
| | | | | 55/400 |
| 2007/0275210 | A1* | 11/2007 | Heselhaus | F01D 5/288 |
| | | | | 428/116 |
| 2011/0120263 | A1* | 5/2011 | Short | F16J 15/40 |
| | | | | 74/606 R |
| 2011/0262695 | A1* | 10/2011 | Lee | F01D 5/184 |
| | | | | 428/131 |
| 2011/0263374 | A1* | 10/2011 | Cripsey | F16H 48/08 |
| | | | | 74/606 R |
| 2012/0237786 | A1* | 9/2012 | Morrison | B22D 19/00 |
| | | | | 428/596 |
| 2012/0325047 | A1* | 12/2012 | Cripsey | F16H 48/40 |
| | | | | 219/121.64 |
| 2013/0036611 | A1* | 2/2013 | Hanna | B21D 53/88 |
| | | | | 29/897.2 |
| 2013/0180402 | A1* | 7/2013 | Short | B01D 46/0031 |
| | | | | 95/261 |
| 2014/0251585 | A1 | 9/2014 | Kusuda et al. | |
| 2014/0299710 | A1* | 10/2014 | Gabrielli | B64C 27/00 |
| | | | | 244/1 N |
| 2014/0373521 | A1* | 12/2014 | DeVita | F16H 45/02 |
| | | | | 60/336 |
| 2018/0066527 | A1* | 3/2018 | Kadau | F01D 11/122 |
| 2018/0135439 | A1* | 5/2018 | Devore | F04D 29/5853 |
| 2018/0218723 | A1* | 8/2018 | Lin | B32B 7/08 |
| 2018/0229863 | A1 | 8/2018 | Veto et al. | |
| 2019/0085972 | A1* | 3/2019 | Uhkoetter | F02C 7/36 |
| 2019/0276138 | A1* | 9/2019 | Donnini | F01D 5/02 |
| 2019/0301298 | A1* | 10/2019 | Dudeck | B22F 5/04 |
| 2020/0049068 | A1* | 2/2020 | Lin | B22F 10/10 |
| 2020/0109664 | A1* | 4/2020 | Herman | B32B 5/024 |
| 2020/0109777 | A1* | 4/2020 | Mueller | B64C 27/14 |
| 2020/0165936 | A1* | 5/2020 | Kasai | F01D 25/24 |

OTHER PUBLICATIONS

Definition of interval, merriam-webster.com, Apr. 9, 2021 (Year: 2021).*
Definition of pattern, merriam-webster.com, Apr. 9, 2021 (Year: 2021).*
Define reciprocating, Google Search, Mar. 10, 2022 (Year: 2022).*
Print matrix in zig-zag fashion, GeeksforGeeks, Aug. 29, 2021 (Year: 2021).*
Definitions of Lattice, Dictionary.com., Apr. 3, 2022 (Year: 2022).*

* cited by examiner

VARIABLE POROSITY LOAD-BEARING AND HEAT-DISSIPATING AIRCRAFT STRUCTURES

STATEMENT REGARDING FEDERALLY SPONSORED RESEARCH OR DEVELOPMENT

Not applicable.

BACKGROUND

This section is intended to provide background information to facilitate an understanding of various technologies described herein. As the section's title implies, this is a discussion of related art. That such art may be related in no way implies that such art is prior art. It should therefore be understood that the statements in this section are to be read in this light and not as admissions of prior art.

In various types of rotary-wing aircraft, such as helicopters and tiltrotor aircraft, a transmission or other type of gearbox may be utilized to couple torque from an output shaft of a turbine engine, for example, to a rotor mast. In some instances, such coupling of torque from an engine output shaft to a rotor mast may involve the use of a variety of gears or other types of rotating mechanical components. Such gears or other types of rotating components may operate to provide a substantially constant angular velocity of the rotor mast even while rotor blade pitch is adjusted to bring about aircraft maneuvers. Accordingly, at least in particular types of rotary-wing aircraft, to provide substantially constant angular velocity of a rotor mast under a variety of flight maneuvers, a transmission or other type of gearbox may comprise a number of planetary gears, bearings, pulleys, belts, and so forth.

Consequently, a helicopter transmission, for example, may generate significant heat responsive to friction generated by mechanical components in contact with one another. In some instances, although lubricants may be utilized to reduce friction between interacting mechanical components, a helicopter transmission, for example, may nonetheless require use of a heat exchanger so as to ensure that temperatures internal to the helicopter transmission do not exceed predetermined limits. However, implementing a heat exchanger on a helicopter may entail a use of a network of conduits, which may operate to transport high-temperature lubricating fluid from the transmission and to return lower-temperature lubricating fluid back to the transmission. It may be appreciated that utilization of such a network of conduits may bring about the possibility of fluid leakage from one or more conduits, which may occur responsive to improper installation of a fluid conduit, excessive vibration of fluid conduits, chafing between a fluid conduit and an adjacent mechanical component, improper installation of conduits and/or fittings, and so forth. Accordingly, development of transmissions having a decreased need for an external heat exchanger for use on rotary-wing aircraft, such as helicopters and tiltrotor aircraft, continues to be an active area of interest.

SUMMARY

Briefly, various implementations of claimed subject matter may relate to a gearbox enclosure, such as an enclosure utilized to accommodate gears of a transmission utilized on a rotary-wing aircraft, comprising an external liner, an internal liner, and a variable porosity region disposed between the external liner and the internal liner. The variable porosity region may be configured for a lubricant to flow therethrough, wherein the external liner, the internal liner, and the variable porosity region may be configured to provide load-bearing capability. In particular implementations, the variable porosity region may operate to remove substantially all of the heat energy of the lubricant as the lubricant passes between a lubricant input port and a lubricant output port of the gearbox enclosure. In certain implementations, the variable porosity region of the gearbox enclosure may comprise a lattice region comprising a porosity of between about 5.0% and about 85.0%.

In particular implementations, at least a portion of a gearbox enclosure may be configured to support a load of between about 1380.0 N/cm$^2$ and about 124,200.0 N/cm$^2$ (about 2000-180,000 psi). A gearbox enclosure may further comprise one or more lubricant conduits, supported by the variable porosity region, to permit the lubricant to flow therethrough, wherein the lubricant conduits are disposed within the variable porosity region. In particular implementations, a gearbox enclosure may be configured to accept an output shaft capable of providing at least about 375.0 kW (503.0 hp).

In various implementations, a method for constructing a gearbox enclosure may comprise forming an external liner, forming an internal liner, and forming a variable porosity region between the external liner and the internal liner, wherein the variable porosity region is configured for a lubricant to flow therethrough. In various implementations, the internal liner, the external liner, and the variable porosity region may be formed via an additive manufacturing process. In particular implementations, an additive manufacturing process may comprise three-dimensional printing. In particular implementations, an additive manufacturing process may comprise material sintering.

In particular implementations, the method for constructing a gearbox enclosure may additionally comprise determining structural loading properties for the gearbox enclosure prior to formation of an external liner, an internal liner, and a variable porosity region. Structural loading properties may range from between about 1380.0 N/cm$^2$ and about 124,200.0 N/cm$^2$ (about 2000-180,000 psi). In certain implementations, the method for constructing a gearbox enclosure may comprise determining heat-dissipation properties for the gearbox enclosure prior to formation of the external liner, the internal liner, and the variable porosity region. Heat-dissipation properties for the gearbox enclosure may involve dissipation of substantially all of the heat energy generated by mechanical and/or electrical components of the gearbox. Such heat may be conveyed to the enclosure in the form of lubricant at an elevated temperature. As the lubricant passes between a lubricant input port and a lubricant output port of the gearbox enclosure, the gearbox may provide significant cooling of the lubricant.

In various implementations, a gearbox enclosure for a rotor system of a rotary-wing aircraft may comprise one or more lubricant input ports, one or more lubricant output ports, and a variable porosity region disposed between the one or more lubricant input ports and the one or more lubricant output ports and disposed between an internal liner and an external liner of the enclosure, wherein the variable porosity region is configured to permit a lubricant to flow between the one or more lubricant input ports and the one or more lubricant output ports. In particular implementations, the internal liner and the external liner of the gearbox enclosure may be configured to provide a predetermined load-bearing capability. In particular implementations, the gearbox enclosure may comprise one or more lubricant conduits within the variable porosity region. In particular implementations, at least a portion of the variable porosity region may be configured to support a load of between about 1380.0 N/cm$^2$ and about 124,200.0 N/cm$^2$ (about 2000-180,000 psi). In particular implementations, the variable porosity region may operate to remove substantially all of the heat generated by the mechanical components of the gearbox as the lubricant passes between the one or more lubricant input ports and the one or more lubricant output ports.

BRIEF DESCRIPTION OF THE DRAWINGS

The present technique(s) will be described further, by way of example, with reference to implementations thereof as illustrated in the accompanying drawings. It should be understood, however, that the accompanying drawings illustrate only the various implementations described herein and are not meant to limit the scope of various techniques, methods, systems, or apparatuses described herein.

Figure 1A:
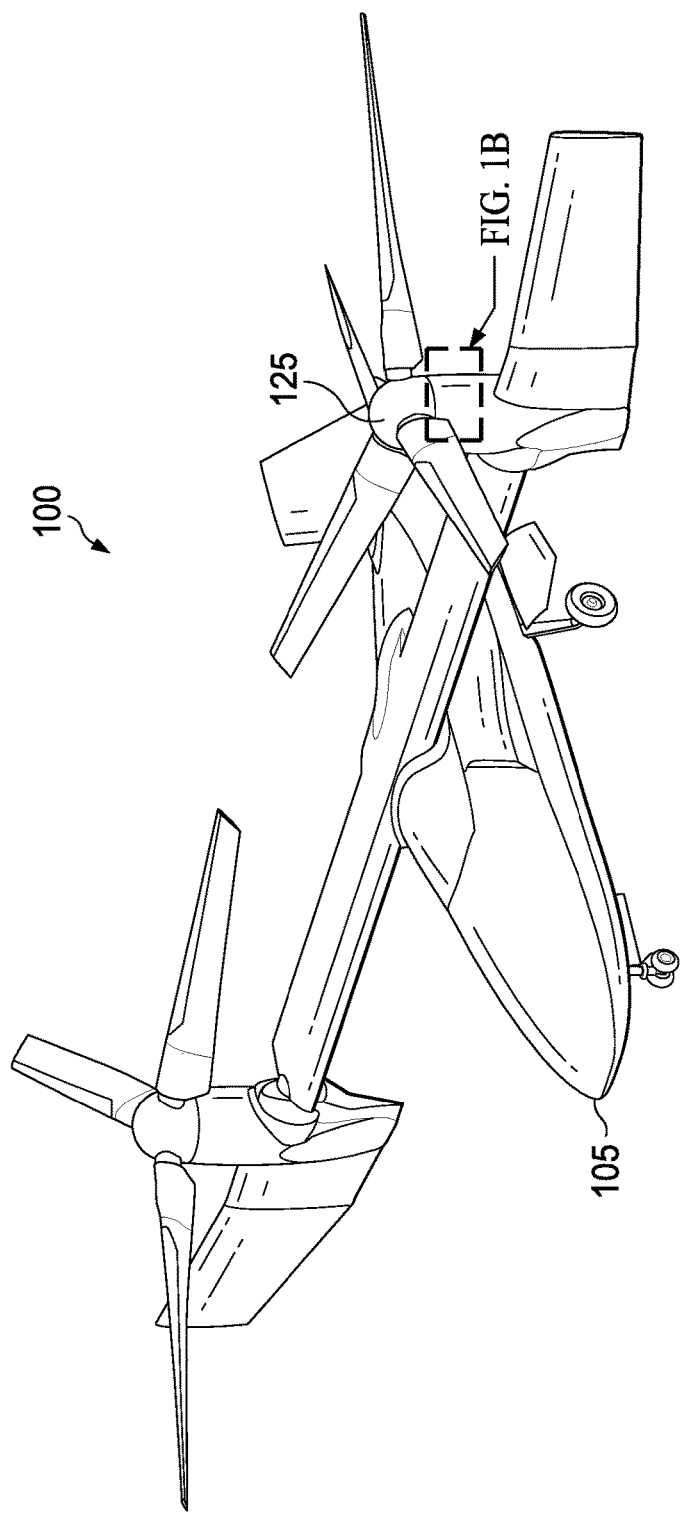
FIG. 1A is an illustration of an engine and transmission gearbox enclosure positioned on a representative rotary-wing aircraft according to various implementations described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict the scope of claimed subject matter. Therefore, the following detailed description is not to be taken to limit claimed subject matter and/or equivalents.

DETAILED DESCRIPTION

As previously mentioned, in various types of rotary-wing aircraft, such as helicopters and tiltrotor aircraft, a transmission or other type of gearbox may be utilized to transmit torque from an output shaft of an engine, such as a turbine engine, to a rotor mast. In some instances, such coupling or transmission of torque from an output shaft of a turbine engine may involve the use of a system of gears or other types of rotating mechanical components to ensure that adequate power, at the appropriate angular velocity, is transferred from the engine to the rotor mast. Such gears or other types of rotating components may operate to provide a substantially constant angular velocity of the rotor mast even while rotor blade pitch is adjusted to bring about aircraft maneuvers. Thus, at least in particular types of rotary-wing aircraft, to provide substantially constant angular velocity of a rotor mast under a variety of flight maneuvers, a transmission or other type of gearbox may comprise a number of planetary gears, bearings, pulleys, belts, and so forth.

Consequently, a helicopter transmission, for example, may generate significant heat in response to friction generated by mechanical components in contact with one another. In some instances, although lubricants may be utilized to reduce friction between interacting mechanical components, a helicopter transmission, for example, may nonetheless require use of a heat exchanger, which may be located remotely from the helicopter transmission, so as to ensure that temperatures internal to the helicopter transmission do not exceed specified limits. However, implementing a remotely-located heat exchanger on a helicopter may entail a use of a network of conduits, which may operate to transport high-temperature lubricating fluid from the transmission and to return lower-temperature lubricating fluid back to the transmission. It may be appreciated that utilization of such a network of conduits may bring about the possibility of fluid leakage from one or more conduits, which may occur responsive to improper installation of a fluid conduit, excessive vibration of fluid conduits, chafing between a fluid conduit and an adjacent mechanical component, improper installation of conduits and/or fittings, and so forth. Accordingly, rotary-wing aircraft may benefit from a decreased need for an external heat exchanger.

In addition, rotary-wing aircraft may also benefit from optimizing load-bearing capabilities of aircraft equipment. Thus, in the instance of a helicopter transmission gearbox enclosure, it may be advantageous to incorporate aircraft structural design requirements into the design parameters of the gearbox enclosure. For example, rather than relying on load-bearing support structures external to a transmission gearbox enclosure, an enclosure may be designed in a manner that provides some load-bearing capability, thereby reducing a need for load-bearing support structures external to the enclosure. This may reduce aircraft weight, which may, in turn, reduce aircraft fuel consumption as well potentially increasing aircraft range and/or providing additional benefits.

In particular implementations of claimed subject matter, particular aircraft structures, such as an enclosure for a gearbox of a helicopter transmission, may be designed in a manner that provides increased heat dissipation as well as increased load-bearing capability. Such structures may be topologically optimized in a manner that permits certain portions of a structure to predominately perform load-bearing functions while other portions of the structure may predominantly perform heat-dissipation functions. Based at least in part on such topological optimization, an enclosure for a gearbox of a helicopter transmission, for example, may operate to reduce a need for a remotely-located heat exchanger as well as reducing a need for external load-bearing support structures. In one implementation, an enclosure for a gearbox of a helicopter transmission may comprise an internal liner and an external liner, which may cooperate to support certain in-flight rotor loads encountered in rotary-wing aircraft. Disposed between the internal and the external liner, a variable porosity material may be utilized to provide a conduit through which a lubricant (e.g., oil, transmission fluid, etc.) at an elevated temperature may pass. Accordingly, the variable porosity material may, in effect, perform a twofold purpose of providing cooling of a lubricant while simultaneously cooperating with the internal liner and the external liner of the enclosure to provide structural support for in-flight rotor loads encountered during aircraft maneuvers.

Particular implementations of claimed subject matter will now be described with reference to the figures, such as FIG. 1A, which is an illustration 100 of an engine and transmission gearbox positioned on representative aircraft 105 according to various implementations described herein. Representative aircraft 105 comprises a tiltrotor unmanned aerial vehicle (UAV). Representative aircraft 105 comprises a fuselage, one or more rotary wings, a rotor system, foldable wing extensions, and landing gear 110. Representative aircraft 105 may be generally operable in a cruise mode, in which the aircraft 100 orients the rotor systems and wing extensions to bring about flight in a forward direction in a manner substantially similar to a fixed wing aircraft. Representative aircraft 105 may also be operable in a vertical takeoff and landing (VTOL) mode, in which the aircraft 105 orients the rotor systems and wing extensions to allow vertical takeoff and landing in a manner substantially similar to a helicopter. In this embodiment, representative aircraft 105 may also operate in a transition mode in which the rotors systems and wing extensions are oriented in positions between the positions that bring about the cruise mode and the VTOL mode.

Although representative aircraft 105 depicts a rotary-wing aircraft (e.g., a tiltrotor aircraft), implementations of claimed subject matter are not limited to applications utilizing such aircraft types. Rather, claimed subject matter is intended to embrace a variety of rotary-wing aircraft environments, such as commercial helicopters, medical airlift helicopters, military helicopters, military tiltrotor aircraft, and so forth. Additionally, although representative aircraft 105 comprises two rotor hubs each driving three tiltrotor aircraft blades, implementations of claimed subject matter may involve rotary-wing aircraft comprising any number of blades, such as helicopters or tiltrotor aircraft comprising three blades, four blades, five blades, and so forth, virtually without limitation.

Figure 1B:
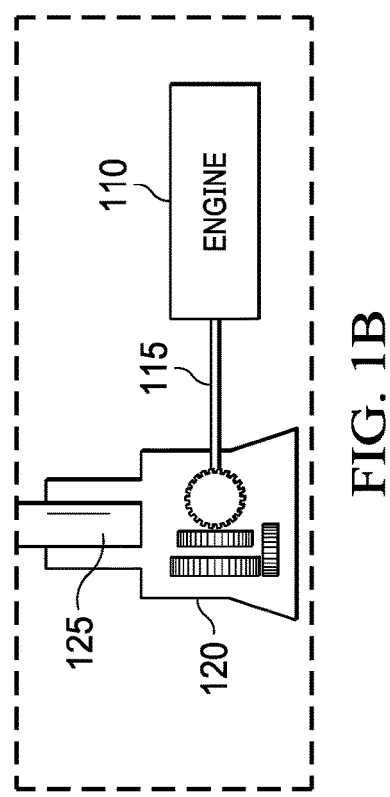
FIG. 1B is an illustration of the transmission gearbox enclosure of the representative aircraft of FIG. 1A according to an implementation described herein.

In FIG. 1B, engine 110, is shown as comprising engine output shaft 115, which provides torque to transmission gearbox 120. In turn, transmission gearbox 120 includes one or more gears and/or other mechanical components, which operate to provide appropriate torque, at an appropriate angular velocity, to rotor mast 125. In particular implementations, rotor mast 125 maintains a substantially constant angular velocity during flight of representative aircraft 105. Engine 110 and/or transmission gearbox 120 may provide torque to additional equipment on board representative aircraft 105, such as one or more generators, a driveshaft coupled to a tail rotor, for example, and claimed subject matter is not limited in this respect. In particular implementations, engine 110 may supply significant power in the form of rotational torque such as, for example, at least 375.0 kW (about 503.0 hp), although claimed subject matter is intended to embrace rotary-wing aircraft engines providing a wide variety of output power, including values less than 375.0 kW, such as 100.0 kW (about 134.1 hp), 200.0 kW (about 268.2 hp), 250.0 kW (about 335.25 hp), for example. Additionally, claimed subject matter may embrace rotary-wing aircraft engines providing output power greater than 375.0 kW such as, for example, engines providing output power of 400.0 kW (about 536.4 hp), 500.0 kW (about 670.5 hp), and so forth, virtually without limitation.

Figure 2:
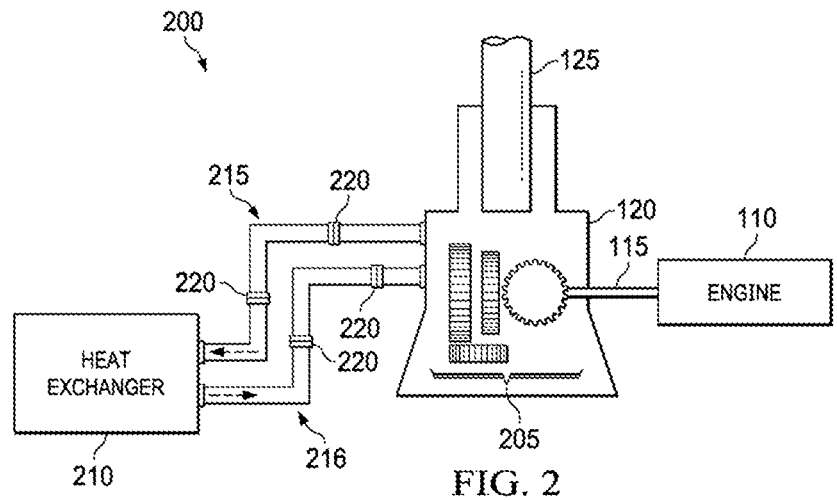
FIG. 2 is an illustration of the transmission gearbox enclosure of FIG. 1B coupled to a heat exchanger according to various implementations described herein.

FIG. 2 is an illustration 200 of the transmission gearbox of FIG. 1B coupled to a heat exchanger according to various implementations described herein. In particular implementations, transmission gearbox 120 may comprise gears 205, which may operate to convert angular rotational torque from engine 110 into angular rotation of rotor mast 125. However, responsive to friction between adjacent components, such as planetary gears, bearings, pulleys, belts, and so forth, transmission gearbox 120 may consume a portion of the horsepower provided by engine output shaft 115. For example, in a particular implementation, responsive to friction among gears 205, transmission gearbox 120 may consume between 37.0 kW (about 50.0 hp) and 112.0 kW (about 150.0 hp). Transmission gearbox 120 may convey a lubricant at an elevated temperature, such as oil, transmission fluid, etc., to heat exchanger 210. Heat exchanger 210, which may comprise a plurality of cooling fins or other structural features exposed to a moving air mass, may operate to transfer at least a portion of heat received from transmission gearbox 120 to the moving air mass.

However, it may be appreciated that heat exchanger 210 may be located a significant distance, such as a distance of 1.0 m or more, from transmission gearbox 120. Accordingly, conduits 215 and 216 may comprise a length of at least 1.0 m, and may be required to bend around structural components of representative aircraft 105, and/or may be required to pass through one or more bulkheads of aircraft 105. Thus, responsive to operation in helicopter vibration environments, for example, one or more of conduits 215 and 216 may be prone to developing one or more sources of leakage of lubricant conveyed between heat exchanger 210 and transmission gearbox 120. In addition, fittings 220, which may join constituent portions of conduits 215 and 216, may also represent a potential source of leakage of lubricant conveyed between heat exchanger 210 and transmission gearbox 120. It may further be appreciated that at least in particular implementations, loss of a significant amount of lubricant may bring about a degradation in the performance of transmission gearbox 120, which may jeopardize crew and/or passenger safety, mission readiness, and so forth.

Figure 3:
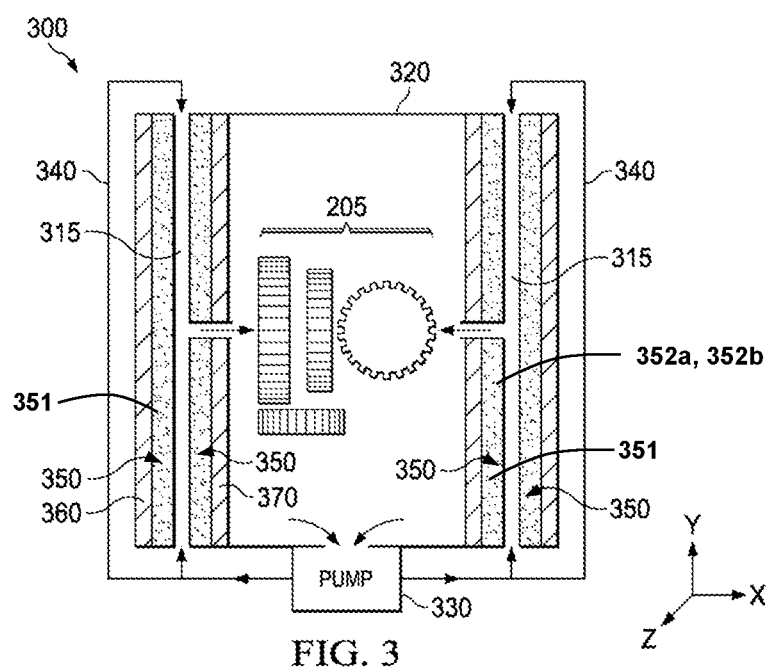
FIG. 3 is an illustration of a representative cross-section of a transmission gearbox enclosure comprising a lubricant conduit according to an implementation described herein.

FIG. 3 is an illustration 300 of a representative cross-section of a transmission gearbox comprising a lubricant conduit according to an implementation described herein. In the implementation of FIG. 3, transmission gearbox enclosure 320 accommodates gears 205, which may operate in a manner similar to gears 205 of FIG. 2. Accordingly, although not shown in FIG. 3, gears 205 may operate to transmit rotational torque from an engine output shaft to a rotor mast so as to enable rotation of the rotor blades of a rotary-wing aircraft. Further, although friction between gears 205 may be reduced through the use of appropriate lubricants, gears 205 may nonetheless generate significant heat, at least some of which may be removed so as to maintain safe operating temperatures within transmission gearbox enclosure 320. Accordingly, through the action of pump 330, lubricating fluid may be collected at a lower portion of transmission gearbox enclosure 320, such as by way of a gravity feed of lubricating fluid to an input port of pump 330. Pump 330 may drive collected lubricating fluid through lubricant conduits 340 to one or more input ports of internal conduits 315.

In the implementation of FIG. 3, internal conduits 315 may be positioned within variable porosity region 350. In particular implementations, variable porosity region 350 may comprise a lattice, wherein a lattice 352a may be defined as a structure comprising a cell pattern which repeats at regular or irregular intervals as illustrated by stippling 351. Thus, in one implementation, variable porosity region 350 may be formed from a lattice comprising a cube structure, for example, that repeats at regular or irregular intervals throughout at least a substantial portion of region 350. In another implementation, variable porosity region 350 may comprise a tetrahedral structure, for example, that repeats at regular or irregular intervals throughout at least a substantial portion of region 350. Claimed subject matter is intended to embrace variable porosity regions comprising a wide variety of cell structures 352b, which may repeat at regular or irregular intervals, such as cubic structures (e.g., simple cubic, body-centered, face-centered, etc.), tetragonal structures (e.g., simple tetragonal, body-centered tetragonal, etc.), monoclinic structures (e.g., simple monoclinic, end-centered monoclinic, etc.), orthorhombic (e.g., simple orthorhombic, body-centered orthorhombic, face-centered orthorhombic, end- centered, orthorhombic, etc.), rhombohedral, hexagonal, triclinic, etc., and claimed subject matter is not limited in this respect.

In particular implementations, the topological configuration of transmission gearbox enclosure 320 may be determined via use of a computer program for performing optimized structural design, such as may be currently available from the Altair Engineering Company having a world headquarters at 1820 E. Big Beaver Rd., Troy, Mich. 48083 (HTTP://www.altair.com). Accordingly, responsive to use of such a computer program for performing optimized structural design, external liner 360 and internal liner 370 may be appropriately sized so as to provide an adequate load-bearing capability in any direction, such as the "X," "Y," or "Z" directions, as indicated in FIG. 3, or loads directed in any combination thereof. In addition to supporting forces in the "X," "Y," or "Z" directions, or combinations thereof, loading may include moments along these axes, or combinations thereof, as well. Further, and also responsive to a use of such a computer program for performing optimized structural design, variable porosity region 350 may comprise a lattice, for example, which may provide at least a portion of the load-bearing capability provided by external liner 360 and internal liner 370.

Thus, in one example, particular unit volumes within variable porosity region 350 may comprise 50.0% metallic ligaments, which may comprise a metal and/or metal alloy utilized in the construction of external liner 360 and internal liner 370, as well as 50.0% ambient air, for example, at locations interspersed between the metallic ligaments. In other implementations, unit volumes within variable porosity region 350 may comprise percentages of metallic ligaments less than 50.0%, such as 5.0%, 10.0%, 20.0%, and so forth. In still other implementations, unit volumes within variable porosity region 350 may comprise percentages of metallic ligaments greater than 50.0%, such as 60.0%, 70.0%, 80.0%, 85.0%, and so forth. Thus, at least in certain implementations, variable porosity region 350 may comprise between about 5.0% and about 85.0% metallic ligaments and the remaining portion comprising ambient air. It may be appreciated that unit volumes of variable porosity region 350 comprising relatively high percentages of metallic ligaments may exhibit greater load-bearing capabilities than unit volumes comprising relatively low percentages of metallic ligaments.

Transmission gearbox enclosure 320 of FIG. 3 also comprises internal conduits 315, which may be supported within variable porosity region 350. Accordingly, when a sufficient volume of cooling air, for example, is drawn through variable porosity region 350, such cooling air may operate to reduce the temperature of a lubricating fluid flowing through internal conduits 315. In addition, heat energy may be conducted through variable porosity region 350 to external liner 360. Conducted heat energy transferred to external liner 360 may then be drawn away from transmission gearbox enclosure 320 via exposure of external liner 360 to ambient air. In particular implementations, variable porosity region 350 may operate to remove at least 10.0% of the heat energy of the lubricating fluid flowing through internal conduits 315. In other implementations, variable porosity region 350 may remove a larger percentage of heat energy of the lubricating fluid, such as 15.0% 25.0%, and so forth. In still other implementations, variable porosity region, cooperating with metallic portions of transmission gearbox enclosure 320 may operate to remove substantially all of the heat generated by the mechanical components housed by enclosure 320. It may be appreciated that unit volumes of variable porosity region 350 comprising relatively low percentage of metallic ligaments, which may permit increased movement of cooling air through variable porosity region 350, may exhibit greater cooling capabilities than unit volumes comprising relatively high percentages of metallic ligaments. It may also be appreciated that during the system design phase of a transmission gearbox of a rotary wing aircraft, transmission gearbox enclosure 320 may be positioned so as to be exposed to ample airflow to provide cooling of lubricant heated by way of friction generated by mechanical components housed by enclosure 320.

Figure 4A:
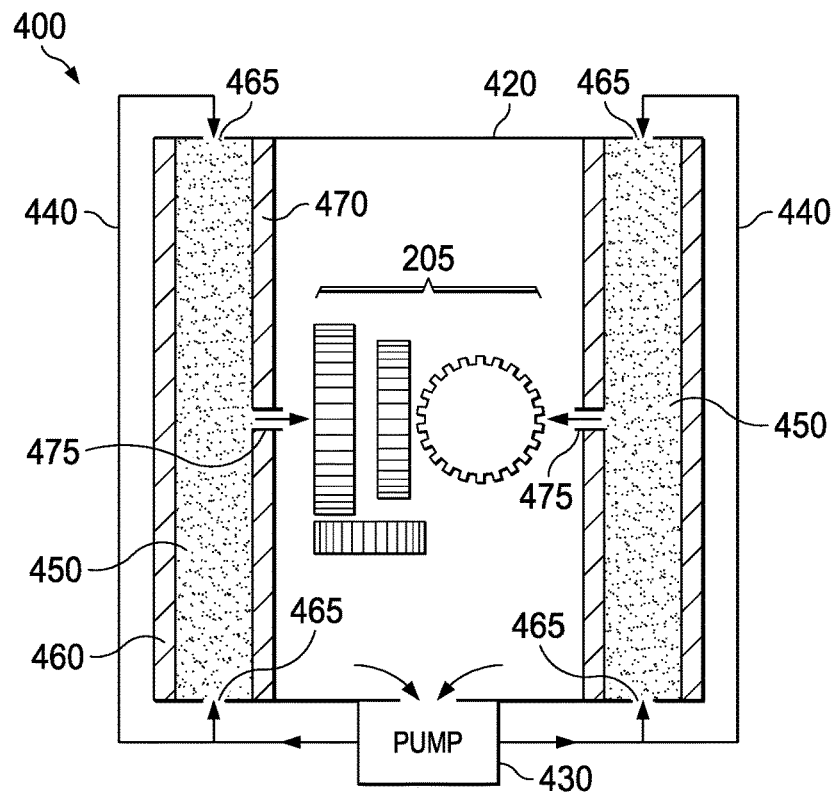
FIGS. 4A-4B are illustrations of representative cross-sections of a transmission gearbox comprising a lubricant conduit according to another implementation described herein.

FIG. 4A is an illustration 400 of a representative cross-section of a transmission gearbox comprising a lubricant conduit according to another implementation described herein. In the implementation of FIG. 4A, transmission gearbox enclosure 420 comprises gears 205, which may operate in a manner similar to gears 205 of FIG. 2. Accordingly, although not indicated in FIG. 4, gears 205 may operate to transmit rotational torque from an engine output shaft to a mast of a rotary-wing aircraft so as to enable one or more rotor blades to operate in flight. Further, gears 205 may generate significant heat, at least some of which may be removed so as to maintain safe operating temperatures within transmission gearbox enclosure 420. Accordingly, through the action of pump 430, lubricating fluid may be collected at a lower portion of transmission gearbox enclosure 420 and forced through lubricant conduits 440 to one or more input ports of variable porosity region 450.

In the implementation of FIG. 4A, variable porosity region 450 may be positioned between external liner 460 and internal liner 470. Variable porosity region 450 may comprise a sealed or closed volume comprising input ports 465 and output ports 475. Thus, in the implementation of FIG. 4, pump 430 may force lubricating fluid through lubricant conduits 440 to input ports 465. Lubricating fluid may flow through variable porosity region 450, and to output ports 475 where the lubricating fluid may be distributed among gears 205 before being recovered by pump 430. Accordingly, via circulation of lubricating fluid through variable porosity region 450, the lubricating fluid may impart or transfer heat energy to region 450. Transferred heat energy may then be drawn away from transmission gearbox enclosure 420 via exposure of external liner 460 to ambient air.

Figure 4B:
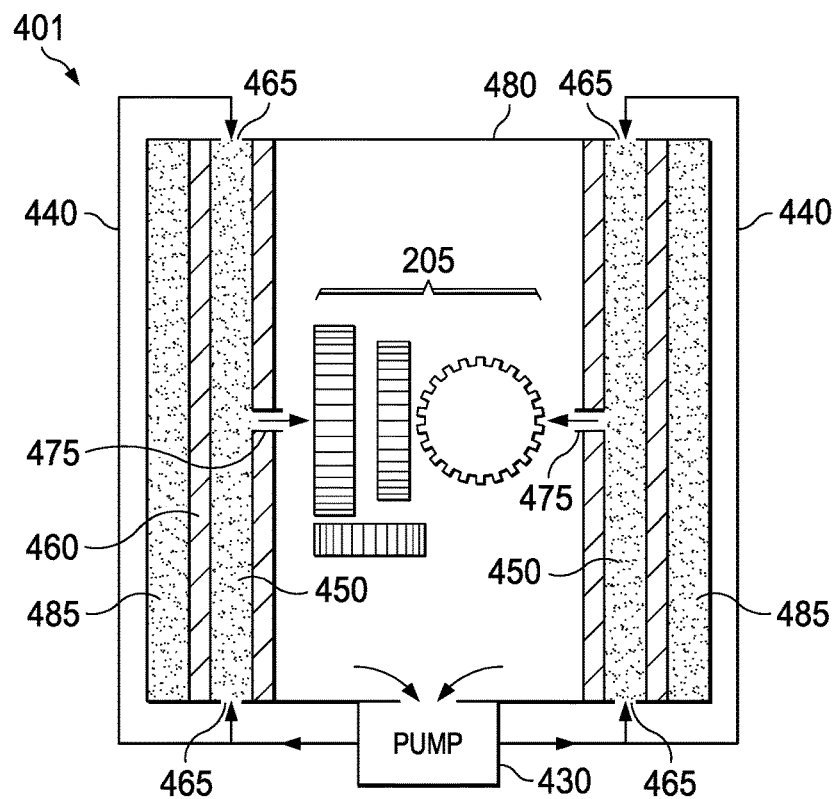

FIG. 4B is an illustration 401 of a representative cross-section of a transmission gearbox comprising a lubricant conduit according to another implementation described herein. In the implementation of FIG. 4B, transmission gearbox enclosure 480 comprises many of the features of transmission gearbox enclosure 420 of FIG. 4A. Accordingly, pump 430 may operate to force a lubricating fluid through lubricant conduits 440, into input ports 465 and through output ports 475. Responsive to contact between the lubricating fluid and gears 205, at least some friction-generated heat energy may be removed from transmission gearbox enclosure 480. Via circulation of the lubricating fluid through variable porosity region 450, heat energy may be transferred to external liner 460. To assist in drawing heat energy from external liner 460, variable porosity region 485 may be attached to external liner 460. Accordingly, via attachment of variable porosity region 485 to external liner 460, a substantially large surface area may be provided, which may enhance an ability to draw heat from external liner 460. In particular implementations, variable porosity region 485 may be optimized to permit increased movement of cooling air between metallic ligaments comprising region 485. Thus, in an implementation, variable porosity region 485 may be optimized so as to provide greater cooling capability at the expense of load-bearing capability. Accordingly, variable porosity region 485 may comprise a relatively low percentage of metallic ligaments, such as less than 50.0% per unit volume, although claimed subject matter is not limited in this respect.

Figure 5:
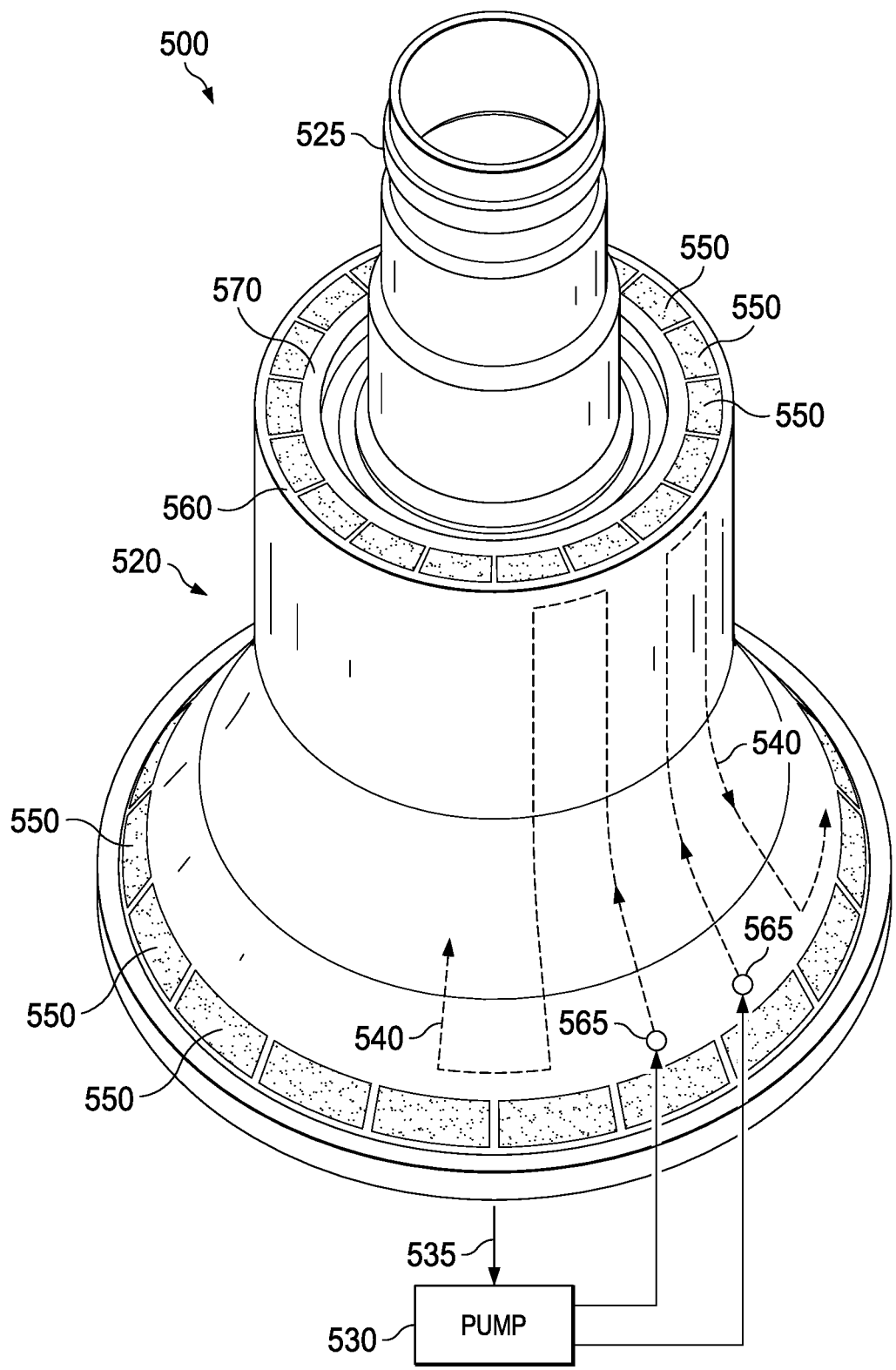
FIG. 5 is an illustration of a transmission gearbox enclosure comprising a lubricant conduit according to another implementation described herein.

FIG. 5 is an illustration 500 of a transmission gearbox enclosure comprising a lubricant conduit according to another implementation described herein. In the implementation of FIG. 5, pump 530 receives lubricating fluid from a base portion of transmission gearbox enclosure 520 as shown by arrow 535. Pump 530 may then force or impel lubricating fluid through input ports 565 for circulation through lubricant conduits 540 (shown by dotted lines in FIG. 5). In the implementation of FIG. 5, lubricating fluid conveyed through conduits 540 may be dispensed to gears enclosed or housed by transmission gearbox enclosure 520 prior to being collected by pump 530. Lubricant conduits 540 may be supported by variable porosity region 550, which may extend from a base portion of gearbox enclosure 520 to a region near rotor mast 525. Variable porosity region 550 may be bounded by external liner 560 and internal liner 570. Accordingly, to bring about cooling of lubricating fluid circulating within lubricant conduits 540, cooling air may be drawn through variable porosity region 550 by way of a fan or other device for creating a current of air. In a particular implementation, in which transmission gearbox enclosure 520 is positioned near rotor blades of a rotary-wing aircraft, rotor downwash may provide a suitable approach toward providing an air flow through variable porosity region 550.

Figure 6:
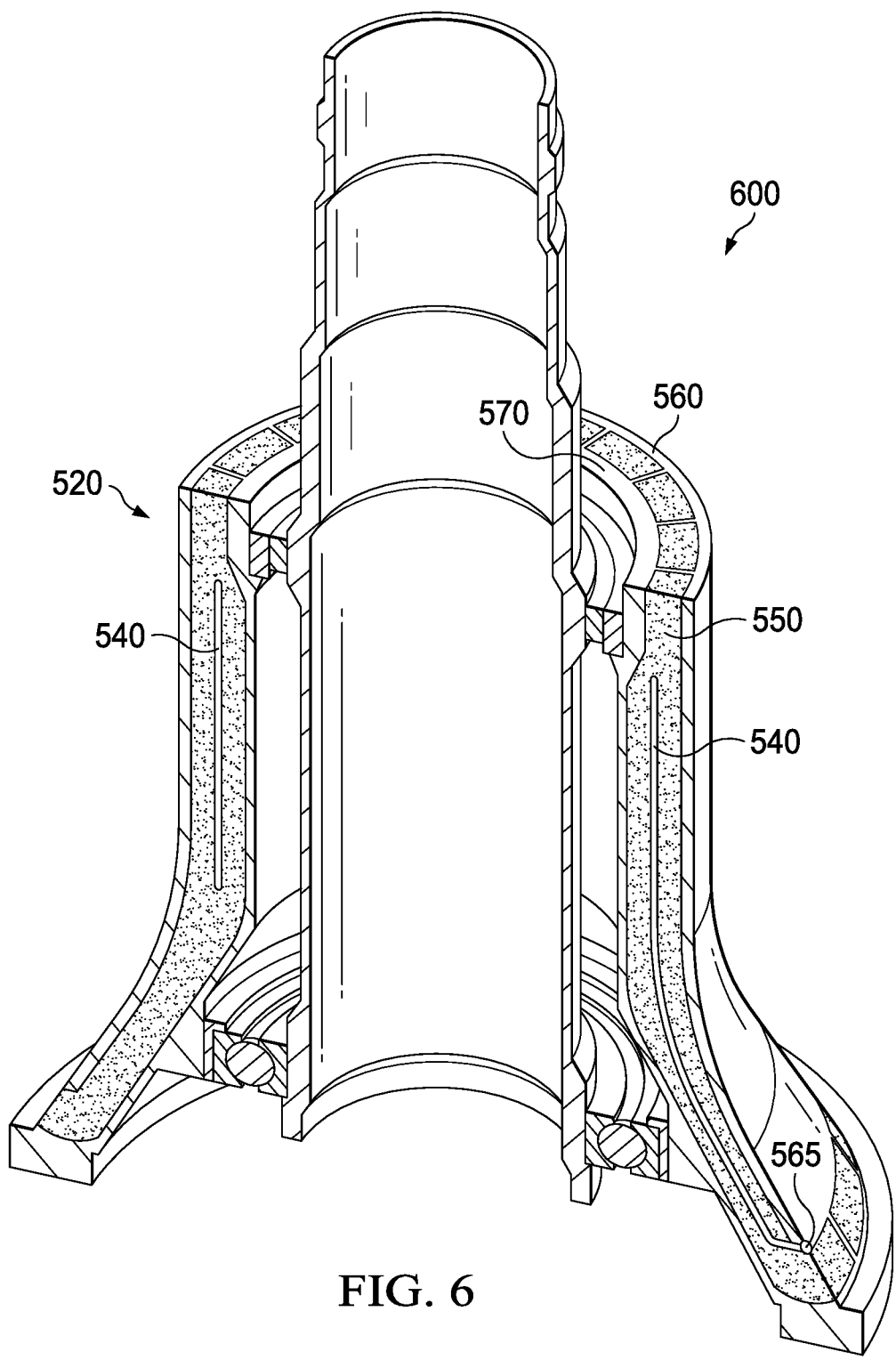
FIGS. 6-7 are illustrations of a transmission gearbox enclosure comprising a lubricant conduit according to an implementation described herein.

FIG. 6 is an illustration 600 showing a cross-section of the transmission gearbox enclosure of FIG. 5 comprising a lubricant conduit according to an implementation described herein. In the illustration of FIG. 6, transmission gearbox enclosure 520 is shown comprising lubricant conduits 540, which may receive lubricating fluid at an elevated temperature, by way of input ports 565. Lubricant conduit 540 may be supported by variable porosity region 550, which may be positioned between external liner 560 and internal liner 570.

Figure 7:
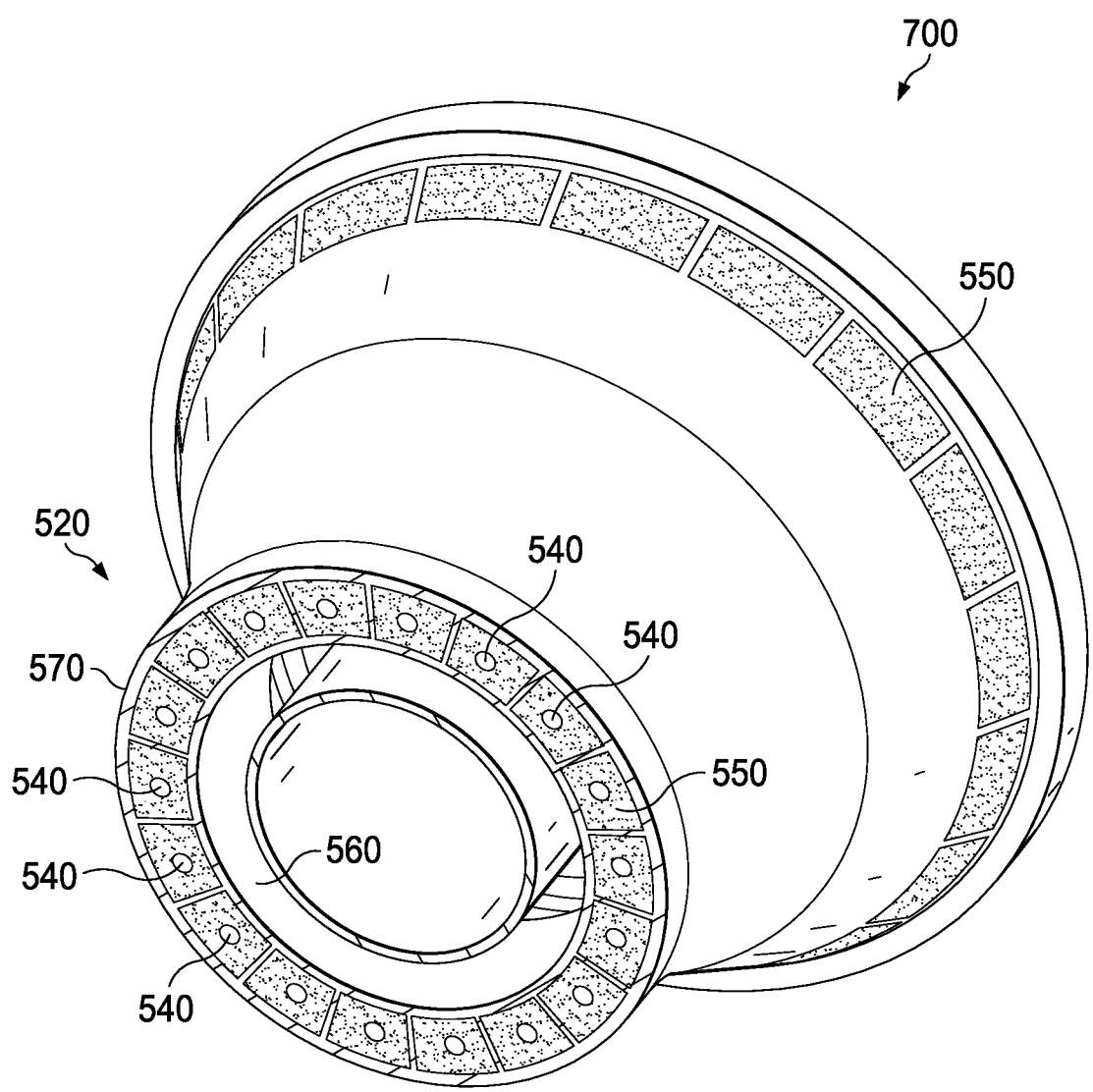

FIG. 7 is an illustration 700 showing another cross-section of the transmission gearbox of FIG. 5 comprising a lubricant conduit according to an implementation described herein. In the illustration of FIG. 7, transmission gearbox enclosure 520 is shown comprising lubricant conduits 540, which may receive lubricating fluid at an elevated temperature. Lubricant conduits 540 may be supported by variable porosity region 550, which may be positioned between external liner 560 and internal liner 570.

Figure 8:
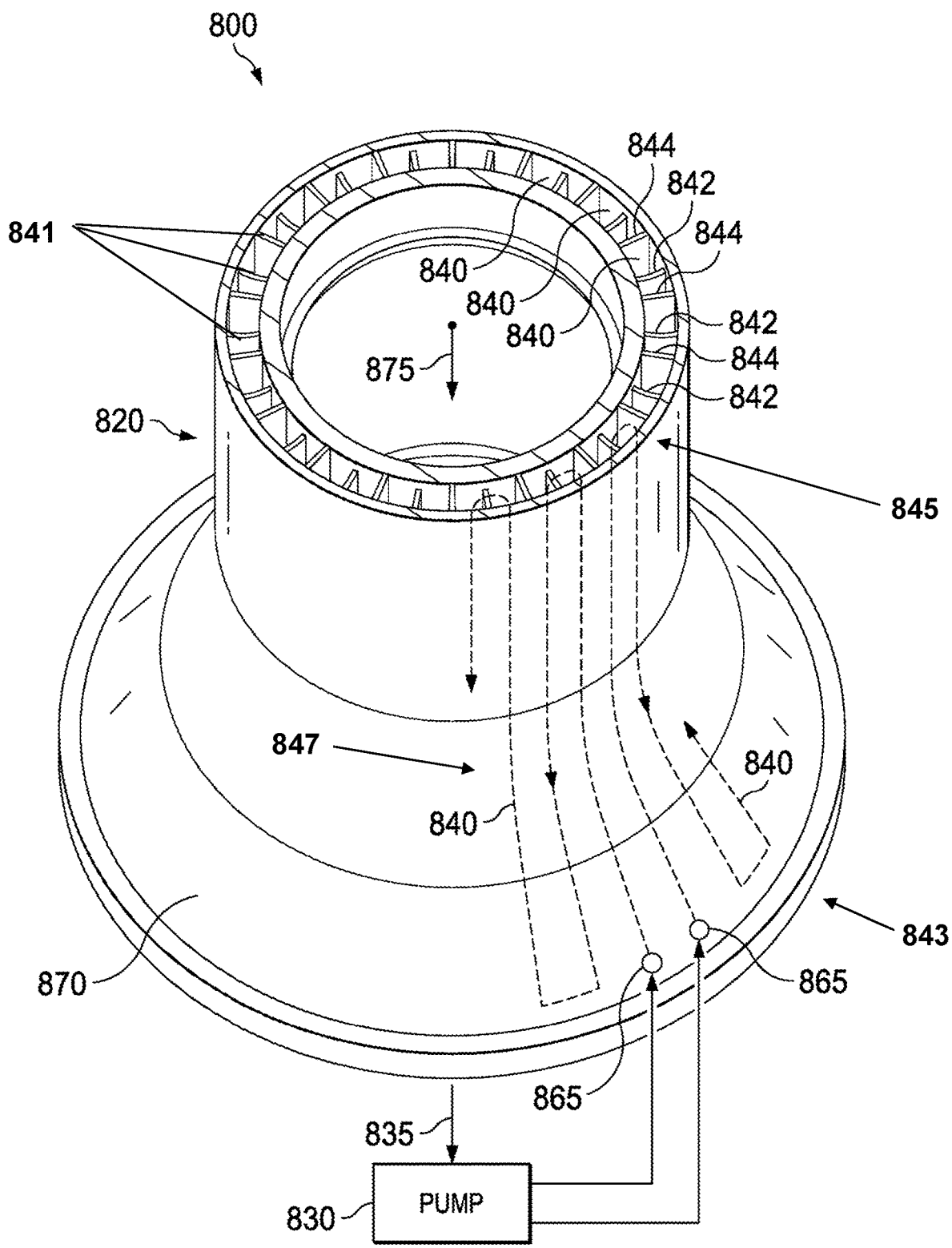
FIG. 8 is an illustration of a transmission gearbox enclosure comprising a lubricant conduit according to another implementation described herein.

FIG. 8 is an illustration 800 showing a cross-sections of a transmission gearbox enclosure comprising a lubricant conduit according to another implementation described herein. In the implementation of FIG. 8, pump 830 receives lubricating fluid from a base portion of transmission gearbox enclosure 820 as shown by arrow 835. Pump 830 may then force or impel lubricating fluid through input ports 865 for circulation through lubricant conduits 840 (shown by dotted lines in FIG. 8). In the implementation of FIG. 8, lubricating fluid conveyed through conduits 840 may be dispensed to gears housed by transmission gearbox enclosure 820 prior to being collected by pump 830. Lubricant conduits 84, defined by dividers 841, may be substantially filled with a variable porosity region, which extends from a base portion 843 of transmission gearbox enclosure 820 to an upper portion 845 of gearbox enclosure 820 opposing the base portion. However, to enhance clarity of FIG. 8, variable porosity material is not shown in FIG. 8.

Alternating portions of lubricant conduit 840 may comprise rounded concave edges 842 positioned at an upper portion of transmission gearbox enclosure 820. In implementations, such rounded concave edges may permit a lubricating fluid to flow in an upward direction (at least with respect to the orientation of transmission gearbox enclosure 820 in FIG. 8) before changing direction and flowing in a downward direction via an adjacent portion of lubricant conduit 840. Likewise, although not shown in FIG. 8, lubricant conduit 840 may comprise rounded concave edges positioned at a lower portion of transmission gearbox enclosure 820. Thus, at a lower portion of transmission gearbox enclosure 820, lubricating fluid may flow in a downward direction before changing direction and flowing in an upward direction, e.g., in a reciprocating path 847, via an adjacent portion of lubricant conduit 840. In the implementation of FIG. 8, flush edges 844, for example, prevent the lubricating fluid from spilling into other adjacent portions of lubricant conduit 840.

Accordingly, rounded concave edges 842 and flush edges 844, which may be alternately positioned at appropriate portions of lubricant conduit 840 may direct flow of a lubricating fluid from input ports 865 to output ports 875. At output ports 875, lubricating fluid may be ejected onto gears (not shown in FIG. 8) housed within transmission gearbox enclosure 820.

Figure 9:
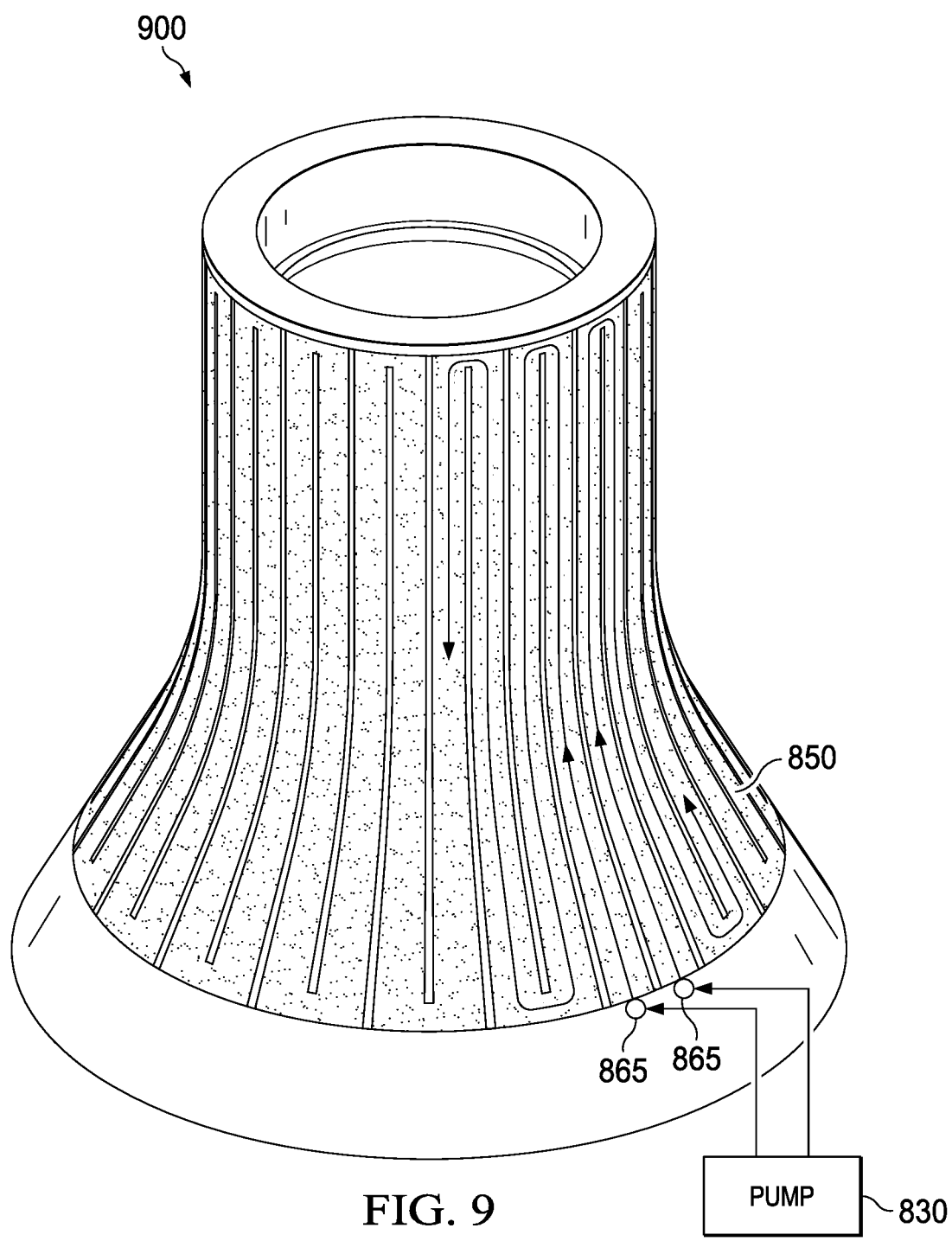
FIG. 9 is an illustration showing the gearbox enclosure of FIG. 8 wherein the external liner has been removed.

FIG. 9 is an illustration 900 showing the transmission gearbox enclosure of FIG. 8, wherein the external liner has been removed. External liner 870 has been removed to show details of variable porosity region 850. Thus, lubricating fluid may be conveyed from pump 830 into variable porosity region 850 via input ports 865. As shown in FIG. 9, the pumped lubricating fluid may flow along a substantial portion of the length of transmission gearbox enclosure 820 before being ejected into an interior volume of gearbox enclosure 820. Prior to ejection of the lubricating fluid, the fluid may be confined to a volume bounded by external liner 860 and internal liner 870.

Figure 10:
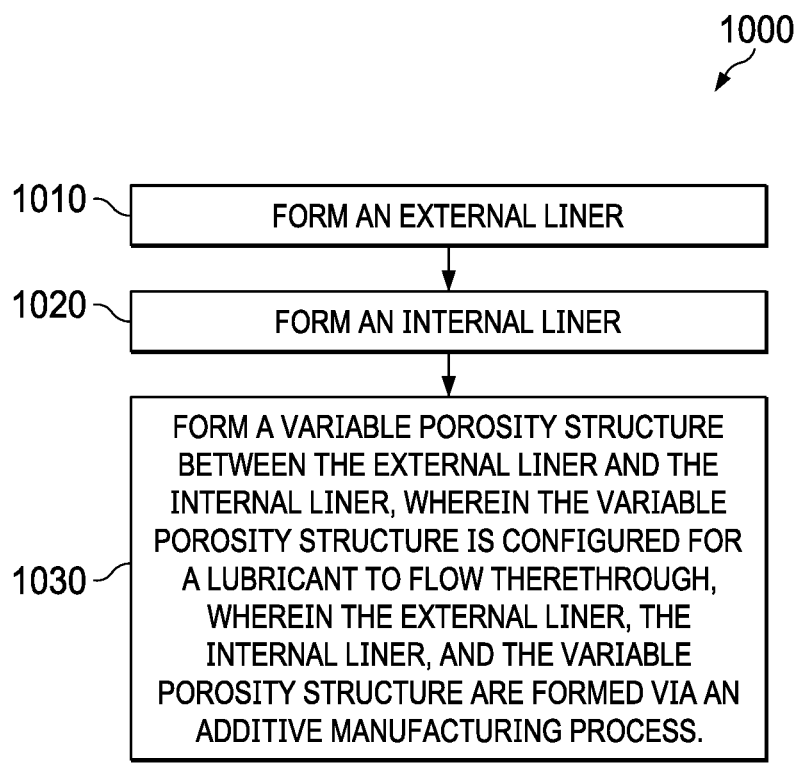
FIG. 10 is a flow chart for a method of constructing a gearbox enclosure according to an implementation described herein.

FIG. 10 is a flow chart 1000 for a method of constructing a transmission gearbox enclosure according to an implementation described herein. FIG. 10 may include blocks in addition to those shown and described, fewer blocks or blocks occurring in an order different than may be identified, or any combination thereof. In particular implementations, a gearbox enclosure may comprise an internal liner, an external liner, and a variable porosity region formed via an additive manufacturing process, such as three-dimensional printing, sintering, and so forth, to form the external liner (such as in block 1010) and to form the internal liner (such as at block 1020). In particular implementations, a transmission gearbox enclosure may comprise a structure that is topologically optimized in a manner that permits certain portions of the enclosure to predominately perform load-bearing functions while other portions of the structure may be designed to predominately perform heat-dissipation functions. In particular implementations, internal and external liners, such as internal and external liners discussed herein, may predominately perform load-bearing functions while variable porosity regions, also as discussed herein, may predominantly provide heat-dissipation functions. Block 1030, which may be performed simultaneously, for example, with blocks 1010 and blocks 1020. A variable porosity region formed between an internal liner and an external liner, such as at block 1030, may be configured for a lubricant to flow therethrough.

Although illustrative implementations of claimed subject matter have been described in detail herein with reference to the accompanying drawings, it is to be understood that the invention is not limited to those precise implementations, and that various changes, additions and modifications can be effected therein by one skilled in the art without departing from the scope of the invention as defined by the appended claims. For example, various combinations of the features of the dependent claims could be made with the features of the independent claims without departing from the scope of claimed subject matter.

What is claimed is:

1. A gearbox enclosure, comprising:
   an external liner;
   an internal liner;
   a gearset surrounded by the gearbox enclosure,
   a porosity region disposed between the external liner and the internal liner; and
   a lubricant conduit disposed within the porosity region, configured in a reciprocating path from a base portion of the gearbox enclosure to a portion of the gearbox enclosure that opposes the base portion,
   wherein the lubricant conduit is configured for a lubricant to flow therethrough, and
   wherein the external liner, internal liner, and the porosity region are configured to provide load-bearing capability.

2. The gearbox enclosure of claim 1, wherein the porosity region operates to remove substantially all of the heat energy generated by mechanical components enclosed by the gearbox enclosure as the lubricant passes between a lubricant input port and a lubricant output port of the gearbox enclosure.

3. The gearbox enclosure of claim 1, wherein at least a portion of the porosity region is configured to support a load of between about 1380.0 N/cm$^2$ and about 124,200.0 N/cm$^2$.

4. The gearbox enclosure of claim 1, wherein the lubricant conduit is at least partially defined by dividers having rounded edges.

5. The gearbox enclosure of claim 1, wherein the gearbox enclosure is configured to accept an output shaft capable of providing at least about 375.0 kW.

6. A gearbox enclosure for a rotor system of a rotary-wing aircraft, comprising:
   one or more lubricant input ports;
   one or more lubricant output ports;
   a gearset surrounded by the gearbox enclosure,
   a porosity region disposed between the one or more lubricant input ports and the one or more lubricant output ports and disposed between an internal liner and an external liner of the gearbox enclosure and
   a lubricant conduit disposed within the porosity region, configured in a reciprocating path from a base portion of the gearbox enclosure to a portion of the gearbox enclosure that opposes the base portion,
   wherein the lubricant conduit is configured to permit a lubricant to flow between the one or more lubricant input ports to the one or more lubricant output ports.

7. The gearbox enclosure of claim 6, wherein the internal liner and the external liner of the gearbox enclosure are configured to provide a predetermined load-bearing capability.

8. The gearbox enclosure of claim 6, further comprising one or more lubricant conduits within the porosity region.

9. The gearbox enclosure of claim 6, wherein at least a portion of the porosity region is configured to support a load of between about 1380.0 N/cm$^2$ and about 124,200.0 N/cm$^2$.

10. The gearbox enclosure of claim 6, wherein the porosity region operates to remove at least 10.0% of the heat energy as the lubricant passes between the one or more lubricant input ports and the one or more lubricant output ports.

* * * * *